US010782911B2

(12) United States Patent
Walker et al.

(10) Patent No.: US 10,782,911 B2
(45) Date of Patent: Sep. 22, 2020

(54) DATA MIGRATION DYNAMIC RANDOM ACCESS MEMORY

(71) Applicant: Micron Technology, Inc., Boise, ID (US)

(72) Inventors: Robert M. Walker, Raleigh, NC (US); Paul Rosenfeld, Bethesda, ID (US); Patrick A. La Fratta, McKinney, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/195,127

(22) Filed: Nov. 19, 2018

(65) Prior Publication Data

US 2020/0159437 A1    May 21, 2020

(51) Int. Cl.
*G06F 3/06* (2006.01)
(52) U.S. Cl.
CPC .......... *G06F 3/0647* (2013.01); *G06F 3/0604* (2013.01); *G06F 3/0673* (2013.01)
(58) Field of Classification Search
CPC ................................................. G06F 3/0647
See application file for complete search history.

(56) References Cited

U.S. PATENT DOCUMENTS

| 5,442,752 | A | 8/1995 | Styczinski | |
|---|---|---|---|---|
| 5,996,051 | A * | 11/1999 | Mergard | G06F 13/1647 710/14 |
| 10,360,155 | B1 | 7/2019 | Thomas et al. | |
| 2013/0305008 | A1 | 11/2013 | Kwon et al. | |
| 2017/0177541 | A1 | 6/2017 | Berman et al. | |
| 2017/0272515 | A1 | 9/2017 | Sanderson | |
| 2018/0005670 | A1 * | 1/2018 | Lee | G06F 3/0644 |
| 2018/0267737 | A1 | 9/2018 | Oe | |

\* cited by examiner

*Primary Examiner* — Edward J Dudek, Jr.
(74) *Attorney, Agent, or Firm* — Holland & Hart LLP

(57) ABSTRACT

Apparatuses and methods for performing data migration operations are disclosed. An apparatus may include at least two interfaces, a first interface supporting data migration operations and a second interface supporting access operations associated with a host device. In some cases, the access operations may be a signal or protocol according to an industry standard or specification (e.g., a DRAM interface specification). The second interface may facilitate supporting industry standard applications, while the first interface supporting data migration operations may provide improved bandwidth for migrating data within the apparatus. The apparatus may include a buffer coupled with the interface and a bank cluster including two or more banks of memory cells. When a host device addresses a bank of the bank cluster, the apparatus may perform one or more data migration operations using the buffer and a different bank of the bank cluster.

19 Claims, 7 Drawing Sheets

DATA MIGRATION DYNAMIC RANDOM ACCESS MEMORY

BACKGROUND

The following relates generally to operating a memory device and more specifically to a data migration dynamic random access memory.

Memory devices are widely used to store information in various electronic devices such as computers, wireless communication devices, cameras, digital displays, and the like. Information is stored by programing different states of a memory device. For example, binary devices most often store one of two states, often denoted by a logic 1 or a logic 0. In other devices, more than two states may be stored. To access the stored information, a component of the electronic device may read, or sense, at least one stored state in the memory device. To store information, a component of the electronic device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRA \/I), resistive RAM (RRAM), flash memory, phase change memory (PCM), and others. Memory devices may be volatile or non-volatile. Volatile memory devices, e.g., DRAM, may lose their stored state over time unless they are periodically refreshed by an external power source. Non-volatile memory, e.g., FeRAM, may maintain their stored logic state for extended periods of time even in the absence of an external power source.

Improving memory devices, generally, may include increasing memory cell density, increasing read/write speeds, increasing reliability, increasing data retention, reducing power consumption, or reducing manufacturing costs, among other metrics. Some memory cells may be configured to store multiple states. Improving a bandwidth (e.g., quantity of data accessed at a given duration) of a memory device may also be desired.

DETAILED DESCRIPTION

Figure 1:
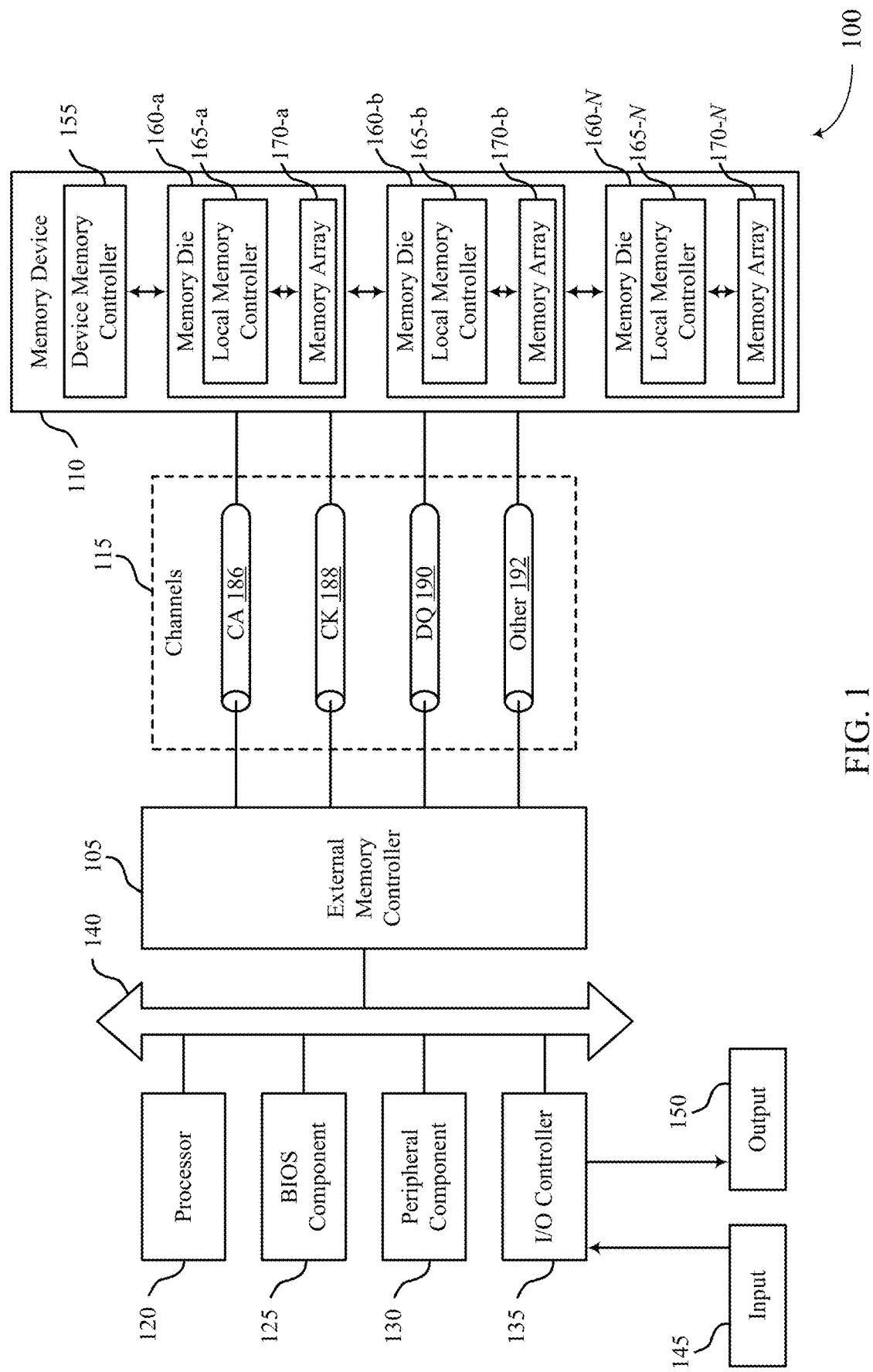
FIG. 1 illustrates an example of a system that supports a data migration dynamic random access memory as described herein.

Some memory devices may include an interface coupled with a host device and the interface may be configured to communicate commands and data between the memory devices and the host device (e.g., a memory controller of the host device). The interface may, in some cases, conform to an industry standard or specification, such as a double data rate (DDR) specification (e.g., DDR4 interface, DDR5 interface, LPDDR interface), a different memory specification directed to graphics or high bandwidth memory, or a persistent memory or storage class memory specification. A performance of the signaling between such a memory device of a memory system and the host device may vary based on a status of the memory system.

For example, performance of the memory system may be based on whether the memory device includes data that the host device requests (e.g., during a read operation) or whether the memory device includes an amount of space to store data that the host device would like to save (e.g., during a write operation) as part of an access operation. If the memory device of the memory system does not include the data or does not include an adequate amount of space to support the access operation, the host device (or the host device through the memory device) may transfer some of the data on the memory device to a storage device (e.g., a solid-state drive (SSD)) associated with the host device as part of a data migration operation. In some cases, the host device may transfer the data using a file system. When using the file system, the data may be transferred over channels between the memory system and the host device and the performance (e.g., bandwidth) of the memory system may decrease during such an access operation.

In some cases, the memory system may be configured to perform data migration operations opportunistically during access periods, such as those already being used to perform access operations requested by the host device. The memory system may include an additional interface (e.g., a data port interface) to support a data migration operation during which a subset of data (e.g., a page) may be migrated during an access period that is already being used to access data requested by the host device. In such examples, the data migration operations may occur concurrent with a host device causing the memory device to be accessed as part of an access operation. In some cases, the memory system may execute a data migration operation as part of a background operation at the same time that the memory device may execute an access operation for the host device as part of a foreground operation.

The additional interface of the memory device may couple with a controller associated with the memory device and, in some cases, associated with other memory devices of a memory system that may be configured to control various aspects of the data migration operation in conjunction with the memory device (and the host device, in some examples). The additional interface may be configured to communicate with the controller—e.g., exchange data, receive commands, or transmit status updates. Additionally, the memory device may include one or more buffers to support the data migration operations. For example, the one or more buffers may be configured to store data (e.g., a page of data) read from the memory device or to be written to the memory device as part of the data migration operation. In some cases, the one or more buffers may be referred to as a data transfer buffer.

To facilitate opportunistic data migration operations, the memory device may include a bank cluster that may be coupled with a buffer (e.g., data transfer buffer). The bank cluster may include two or more banks of memory cells. The host device may be configured to address a bank of the bank cluster as part of an access operation using an interface that conforms to a DDR specification (e.g., LPDDR interface or DDR4 interface). The host device may be configured to address a single bank of the bank cluster as part of an access operation—e.g., in accordance with the DDR specification. In some cases, when the host device causes the bank of the bank cluster to be accessed by transmitting one or more commands and/or data using the DDR4 interface (e.g., a foreground operation), the controller, in conjunction with the memory device in some cases, may transfer data (e.g., read data, write data) between the buffer and an alternate bank of the bank cluster as part of a data migration operation (e.g., a background operation).

In this manner, a memory device may be configured to execute commands issued by a host device and concurrently execute data migration commands. In some cases, the memory device may mitigate reductions in performance (e.g., bandwidth and/or latency) caused by data migration operations. The memory device may be configured to perform a data migration operation as part of a background operation concurrent with performing foreground operation (e.g., access operation) requested by the host device. In other words, the host device may continue to operate the memory device using the legacy interface (e.g., DDR4 interface), while the controller associated with the memory system may use the additional interface (which may be hidden from the host device) to execute a data migration operation and support an improved overall bandwidth between the memory device and the host device.

In some cases, the memory device may be part of a memory system (e.g., two-tier memory system) that includes at least two types of memory devices. The memory system may include a first memory device having a relatively fast access speed and a second memory device having a relatively large capacity. In some cases, the first memory device may include memory cells that implement volatile memory technology and the second memory device may include memory cells that implement non-volatile memory technology. In some cases, the first memory device may include DRAM cells and the second memory device may include 3-dimensional (3D) Not-AND (NAND) or 3D XPoint™ memory cells. A memory device (e.g., DRAM configured with a legacy interface and a data port interface as described herein), when implemented as a first memory device in a two-tier memory system, may provide a fast data exchange path between the first memory device (e.g., DRAM configured with a legacy interface and a data port interface as described herein) and the second memory device (e.g., 3D NAND or 3D XPoint™ memory device) to facilitate an increased storage capacity available to a host device.

The two-tier memory system may provide an improved performance (e.g., bandwidth) when compared to a storage device that may support a file system because data being transferred as part of a data migration operation may not be communicated over channels linking the host device with the memory system generally. By incorporating the second memory device into a memory system (rather than being associated with the host device), the amount of data transmitted over channels between the host device and the memory system during a data migration operation may be reduced. Thus, the bandwidth and other performance parameters associated with the memory system may improve.

In some cases, an apparatus may include an interface (e.g., data port interface) configured to communicate with a controller as part of a data migration operation, a buffer coupled with the interface and configured to store data as part of the data migration operation, and a bank cluster including a first bank and a second bank and coupled with the buffer, where the first bank may be configured to be accessed by a host device (e.g., a memory controller of a host) during an access period as part of an access operation and the second bank may be configured to transfer data with the buffer during the access period as part of the data migration operation concurrent with the first bank being accessed by the memory controller.

In some cases, an apparatus may include an interface (e.g., data port interface) configured to communicate with a controller as part of one or more data migration operations, a set of bank clusters each including a set of banks and a set of sense components, and a buffer coupled with the set of bank clusters and the interface and configured to store data associated with the set of banks as part of the one or more data migration operations that each include transferring data between the buffer and a first bank of a first bank cluster while a second bank of the first bank cluster is accessed by a host device (e.g., a memory controller of a host device). In such cases, the buffer may be configured to store a first quantity of data during at least a portion of one of the one or more data migration operations, the first quantity of data being less than a total quantity of data migrated during the one or more data migration operations.

In some cases, a memory device may include a bank cluster, one or more buffers coupled with the bank cluster and configured to store data associated with the bank cluster, an interface (e.g., data port interface) coupled with the one or more buffers and configured to communicate with a controller, a second interface coupled with the bank cluster and configured to communicate with a host device, and a local controller coupled with the bank cluster, the one or more buffers, the interface, and the second interface. In some cases, the local controller may receive a data migration command from the host device using the second interface, transmit at least a portion of the data migration command to the controller using the interface, receive a command from the controller based on transmitting the at least the portion of the data migration command, perform an operation indicated in the command received from the controller, and transmit a status of the data migration command to the host device based on performing the operation and receiving a polling command from the host device.

In some cases, a controller may receive a command to transfer data between a first bank of a bank cluster and a different bank, determine that a host device (e.g., a memory controller of a host) addresses a second bank of the bank cluster during an access period, and transfer the data between the first bank of the bank cluster and a buffer during the access period that the memory controller addresses the second bank of the bank cluster based on the command, where the buffer may store the data associated with the first bank as part of a data migration operation.

In some cases, the controller may transmit, based on receiving the command to transfer the data, a status of the buffer indicating that the buffer includes the data to store in the first bank and store the data in the first bank of the bank cluster based on transmitting the status, where the command to transfer the data includes a commit command to transfer the data from the buffer to the first bank, and where transferring the data between the buffer and the first bank of the bank cluster is based on storing the data in the first bank.

In some cases, the controller may transmit, based on receiving the command to transfer the data, a status of the buffer that indicates the buffer is available to store the data and store the data in the buffer based on transmitting the status of the buffer, where the command to transfer the data includes an evict command to transfer the data from the first bank to the buffer, and where transferring the data between the buffer and the first bank of the bank cluster may be based on storing the data in the buffer.

Features of the disclosure are initially described in the context of a memory system described with reference to FIG. 1. Then, features of the disclosure are described in the context of a memory die (e.g., a memory device) described with reference to FIG. 2. The features of the disclosure are further described in the context of various diagrams that support a data migration dynamic random access memory as described herein as described with reference to FIGS. 3 through 5. These and other features of the disclosure are further illustrated by and described with reference to an apparatus diagram and a flowchart that relate to a data migration dynamic random access memory as described with reference to FIGS. 6 and 7.

FIG. 1 illustrates an example of a system 100 that utilizes one or more memory devices in accordance with aspects disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be a component configured to store data for one or more other components of the system 100. In some examples, the system 100 is configured for bi-directional wireless communication with other systems or devices using a base station or access point. In some examples, the system 100 is capable of machine-type communication (MTC), machine-to-machine (M2M) communication, or device-to-device (D2D) communication.

At least some portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host, a host device, or a memory controller of host device.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic I/O system (BIOS) component 125, one or more peripheral components 130, and an I/O controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, etc. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

In some cases, one or more memory dice 160 may be configured to include a buffer (e.g., data transfer buffer as described herein). In some cases, the buffer may be configured as a set of smaller-sized buffers and the smaller-sized buffers of the set may be distributed within a memory array (e.g., memory array 170-a). Such distributed buffer configuration may facilitate each smaller-sized buffer of the set to be located near a part of memory array (e.g., a bank cluster of memory array 170-a) that may be associated with the smaller-sized buffer of the set. In other cases, the buffer may be configured to be common to the memory array (e.g., memory array 170-a) and may be located within a memory die (e.g., memory die 160-a).

In some cases, the memory arrays 170 may be configured to include one or more bank clusters that may be coupled with a buffer (e.g., data transfer buffer as described herein). Each bank cluster may be configured to include two or more banks. In some cases, a host device (e.g., external memory controller 105) may access a first bank of a bank cluster during an access period of an access operation (e.g., read operation, write operation).

Additionally, a second bank of the bank cluster may be configured to transfer data with the buffer during the access period as part of a data migration operation (e.g., a background operation) concurrent with the first bank being accessed by the host device (e.g., a foreground operation). In some cases, the host device (e.g., external memory controller 105) may be configured to access a single bank of a bank cluster during an access period as part of the access operation.

In some cases, one or more memory dice 160 may be configured to include an interface (e.g., data port interface as described herein) configured to communicate with a controller (e.g., device memory controller 155) as part of a data migration operation. In some cases, a buffer of a memory die (e.g., memory die 160-a) may be coupled with the interface and configured to store data as part of the data migration operation. In some cases, the interface may include a data channel configured to transmit and receive data between the buffer and the controller, a command channel configured to receive an access command from the controller, a response channel configured to transmit a response to the controller, or a data bus, or any combination thereof.

In some cases, one or more memory dice 160 may be configured to include a second interface (e.g., DDR4 interface as described herein) that may be coupled with a bank cluster (e.g., a bank cluster of memory array 170-a of memory die 160-a). The second interface may be configured to communicate commands or data with a host device (e.g., external memory controller 105) as part of the data migration operation or during an access operation. In some cases, one or more memory dice 160 (e.g., local memory controllers 165 of the one or more memory dice 160) may receive a data migration command from the host device (e.g., external memory controller 105) using the second interface. In some cases, one or more memory dice 160 (e.g., local memory controllers 165 of the one or more memory dice 160) may support an access command from the host device using the second interface.

In some cases, two or more memory dice 160 may support a two-tier memory system or memory configuration as described herein. For example, a first memory die 160-a may be a DRAM configured with at least two interfaces (e.g., a legacy interface and a data port interface as described herein). The legacy interface of the first memory die 160-a may be configured to couple with a host device (e.g., external memory controller 105) supporting an industry standard or specification—e.g., various double data rate (DDR) specifications, LPDDR specifications, DDR4 specifications, DDR5 specifications, graphics double data rate (GDDR) specifications, and the like. Additionally, the data port interface of the first memory die 160-a may be configured to couple with a controller (e.g., device memory controller 155) that may be configured to control various aspects of the data migration operation as part of a background operation in conjunction with the first memory die 160-a. Further, a second memory die 160-b may include a 3D XPoint™ memory cells and be configured to couple with the device memory controller 155. The second memory die 160-b may provide a non-volatile memory capacity that may provide a relatively fast memory space available for the first memory die 160-a (e.g., DRAM) to swap data (e.g., storing a page of data, retrieving a page of data) to support an improved bandwidth.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a plurality of memory dice 160-N may be stacked on top of one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120.

In some examples, the device memory controller 155 may be configured to control various aspects of the data migration operation in conjunction with one or more memory dice 160. In some cases, the device memory controller 155 may be referred to as a data migration controller. In some cases, the device memory controller 155 may receive a command to transfer data between a first bank of a bank cluster (e.g., a first bank of a bank cluster in a memory array 170-*a*) and a different bank (e.g., a bank of a bank cluster in a memory array 170-*b*). The device memory controller 155 may determine that a host device (e.g., external memory controller 105) addresses a second bank of the bank cluster (e.g., a second bank of the bank cluster in the memory array 170-*a*) during an access period. Further, the device memory controller 155 (or the device memory controller 155 in conjunction with a local memory controller 165-*a* coupled with the memory array 170-*a*) may transfer the data between the first bank of the bank cluster (e.g., the first bank of the bank cluster in the memory array 170-*a*) and a buffer (e.g., a buffer in a memory die 160-*a*) during the access period that the host device (e.g., external memory controller 105) addresses the second bank of the bank cluster (e.g., the second bank of the bank cluster in the memory array 170-*a*) based on the command, where the buffer may be configured to store the data associated with the first bank as part of a data migration operation.

In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

An apparatus may include a controller (e.g., data migration controller, device memory controller 155), a first memory device (e.g., memory die 160-*b*) including memory cells of a first type (e.g., 3D XPoint™ memory cells) and coupled with the controller, and a second memory device (e.g., memory die 160-*a*) including memory cells of a second type (e.g., DRAM cells) different than the first type. The second memory device may include at least one bank cluster, one or more buffers configured to store data as part of a data migration operation that is associated with the bank cluster, an interface (e.g., data port interface as described herein) coupled with the one or more buffers and configured to communicate with the controller, and a second interface (e.g., DDR4 interface as described herein) coupled with the bank cluster and configured to communicate with a host device (e.g., a memory controller of a host device, external memory controller 105), and a local controller (e.g., local memory controller 165-*a*) coupled with the bank cluster, the one or more buffers, the interface, and the second interface.

In some examples, the local memory controller 165-*a* may receive a data migration command from the host device using the second interface. The local memory controller 165-*a* may transmit at least a portion of the data migration command to another controller (e.g., data migration controller, device memory controller 155) using the interface. Subsequently, the local memory controller 165-*a* may receive a command from the other controller based on transmitting the at least the portion of the data migration command and perform an operation indicated in the command received from the other controller (e.g., a commit operation associated with storing data in a bank of a bank cluster from a buffer, an evict operation retrieving data from a bank of a bank cluster to store in a buffer). The local memory controller 165-*a* may transmit a status of the data migration command to the host device based on performing the operation and receiving a polling command from the host device.

In some cases, the portion of the data migration command may include an evict command for the controller (e.g., data migration controller, device memory controller 155) to access the second memory device (e.g., memory die 160-*a*). The operation associated with the evict command may include reading data from the second memory device as part of data migration operation. In some cases, the data read from the second memory device may be stored in a buffer. The status of the data migration command may include an output of a status register of the second memory device. The status register may be configured to indicate a status associated with the evict command.

In some cases, the portion of the data migration command may include a commit command for the controller (e.g., data migration controller, device memory controller 155) to access the second memory device (e.g., memory die 160-*a*). The operation associated with the commit command may include storing data in the second memory device as part of a data migration operation. In some cases, the data stored in the second memory device may come from a buffer. The status of the data migration command may include an output of a status register of the second memory device. The status register may be configured to indicate a status associated with the commit command.

The external memory controller 105 may be configured to facilitate communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel. In some cases, a pin or pad of a terminal may be part of a signal path of the channel 115.

Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data (DQ) channel 190 may be ×4 (e.g., including four signal paths), ×8 (e.g., including eight signal paths), ×16 (including sixteen signal paths), etc.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include eight or nine signal paths.

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended.

In some cases, the clock signal may be a 1.5 GHz signal. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK may therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The data channels 190 may be configured to communicate data and/or control information between the external memory controller 105 and the memory device 110. For example, the data channels 190 may communicate (e.g., bi-directional) information to be written to the memory device 110 or information read from the memory device 110. The data channels 190 may communicate signals that may be modulated using a variety of different modulation schemes (e.g., NRZ, PAM4).

In some cases, the channels 115 may include one or more other channels 192 that may be dedicated to other purposes. These other channels 192 may include any quantity of signal paths.

In some cases, the other channels 192 may include one or more write clock signal (WCK) channels. While the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK_t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 192 may, optionally, include one or more error detection code (EDC) channels. The EDC channels may be configured to communicate error detection signals, such as checksums, to improve system reliability. An EDC channel may include any quantity of signal paths. In some cases, the other channels 192 may, optionally, include one or more general purpose I/O channels (which may also be referred to as side channels, sideband channels). In some cases, external memory controller 105 (e.g., a host device) may transmit a command to device memory controller 155, where the command may be associated with one or more data migration operations.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM4, PAM8, etc., quadrature amplitude modulation (QAM), quadrature phase shift keying (QPSK), and/or others. A multi-symbol signal or a PAM4 signal may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

Figure 2:
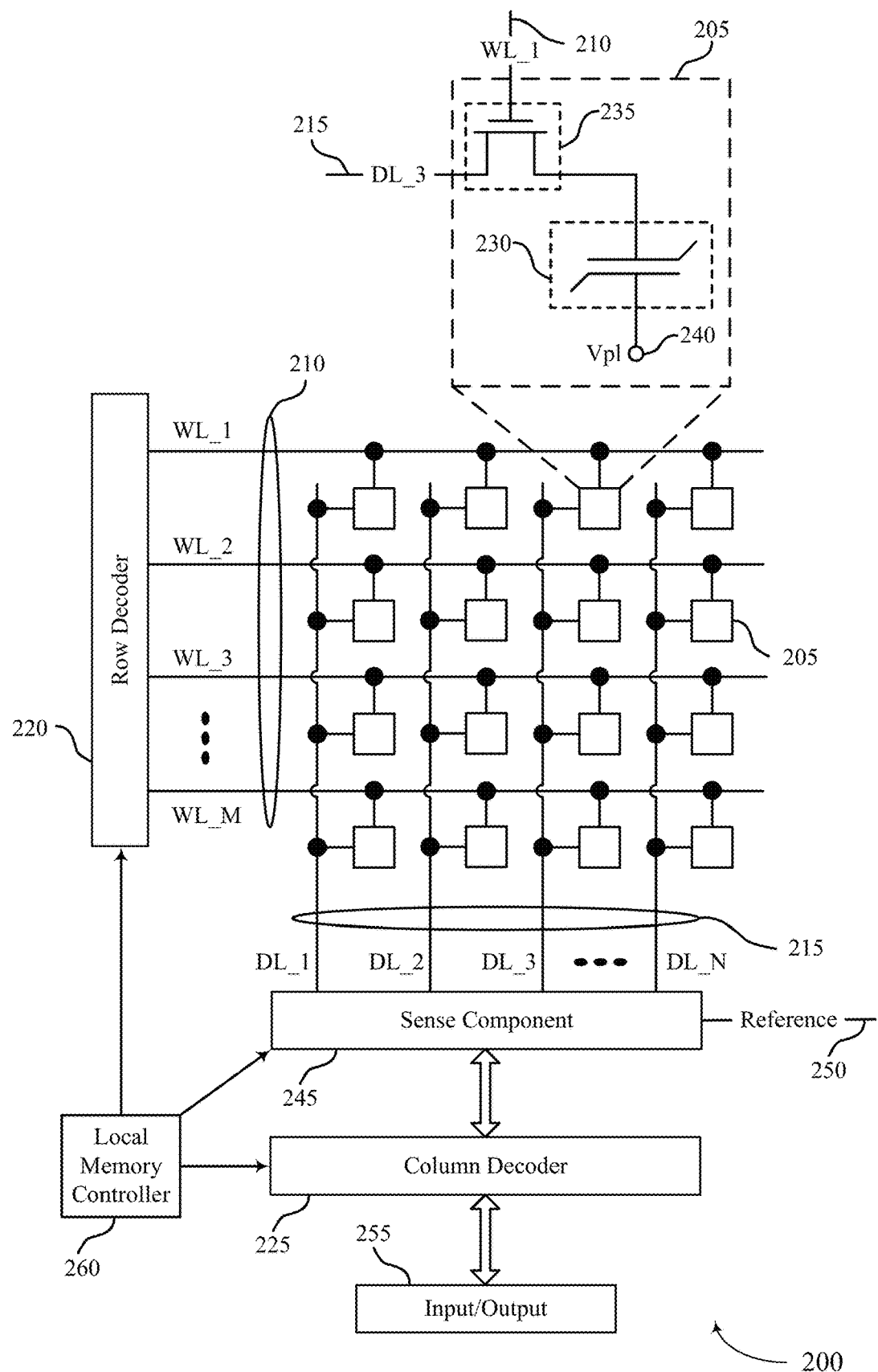
FIG. 2 illustrates an example of a memory die that supports a data migration dynamic random access memory as described herein.

FIG. 2 illustrates an example of a memory die 200 in accordance with various examples of the present disclosure. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. As used herein, a charge refers to an amount of charge present in or on a component or a conductor and is not limited to a particular value carried by a single proton or electron. DRAM architectures may include a capacitor (e.g., a capacitor 230) that includes a dielectric material to store a charge representative of the programmable state. In some examples, the memory cell 205 may be coupled with a sense component 245 via a digit line 215.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 and a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 and a cell switching component 235. The capacitor 230 may be an example of a dielectric capacitor or a ferroelectric capacitor. A first node of the capacitor 230 may be coupled with the cell switching component 235 and a second node of the capacitor 230 may be coupled with a voltage source 240. In some cases, the voltage source 240 may be the cell plate reference voltage, such as Vpl. In some cases, the voltage source 240 may be an example of a plate line coupled with a plate line driver. The cell switching component 235 may be an example of a transistor or any other type of switch device that selectively establishes or de-establishes electronic communication between two components.

In some cases, a set of memory cells 205 may be configured to include at least one bank cluster that may include two or more banks of memory cells 205. In some cases, the set of bank clusters each may include a set of banks and a set of sense components (e.g., sense component 245). In some cases, a host device (e.g., a memory controller of a host device through local memory controller 260 of memory die 200) may access a bank of the bank cluster during an access operation using an interface that may conform to a DDR specification (e.g., LPDDR interface or DDR4 interface). The host device may be configured to access a single bank of the bank cluster—e.g., in accordance with the DDR specification. In some cases, when the host device causes the bank of the bank cluster to be accessed by communicating a command using the DDR4 interface, a controller (e.g., data migration controller) may transfer data (e.g., read data, write data) between a buffer (e.g., data transfer buffer) and an alternate bank of the bank cluster as part of a data migration operation using another interface (e.g., data port interface).

In some cases, the memory die 200 may be configured to include a buffer (e.g., data transfer buffer as described herein) that may be configured to couple with the bank clusters of the memory die 200. In some cases, the buffer may be configured to include a set of smaller-sized buffers and the smaller-sized buffers of the set may be distributed within a memory array including memory cells 205. Such distributed buffer configuration may facilitate each smaller-sized buffer of the set to be located near a part of memory array (e.g., a bank cluster) that may be associated with the smaller-sized buffer of the set. In other cases, the buffer may be configured to be common to the memory array of the memory die 200 and may be located within a memory die (e.g., memory die 200).

Selecting or deselecting the memory cell 205 may be accomplished by activating or deactivating the cell switching component 235. The capacitor 230 may be in electronic communication with the digit line 215 using the cell switching component 235. For example, the capacitor 230 may be isolated from digit line 215 when the cell switching component 235 is deactivated, and the capacitor 230 may be coupled with digit line 215 when the cell switching component 235 is activated. In some cases, the cell switching component 235 is a transistor and its operation may be controlled by applying a voltage to the transistor gate, where the voltage differential between the transistor gate and transistor source may be greater or less than a threshold voltage of the transistor. In some cases, the cell switching component 235 may be a p-type transistor or an n-type transistor. The word line 210 may be in electronic communication with the gate of the cell switching component 235 and may activate/deactivate the cell switching component 235 based on a voltage being applied to the word line 210.

A word line 210 may be a conductive line in electronic communication with a memory cell 205 that is used to perform access operations on the memory cell 205. In some architectures, the word line 210 may be in electronic communication with a gate of a cell switching component 235 of a memory cell 205 and may be configured to control the cell switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the cell switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The sense component 245 may be configured to detect a charge stored on the capacitor 230 of the memory cell 205 and determine a logic state of the memory cell 205 based on the stored charge. The charge stored by a memory cell 205 may be extremely small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change.

The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include various transistors or amplifiers to detect and amplify a difference in the signals.

The detected logic state of memory cell 205 may be output through column decoder 225 as output 255. In some cases, the sense component 245 may be part of another component (e.g., a column decoder 225, a row decoder 220). In some cases, the sense component 245 may be in electronic communication with the row decoder 220 or the column decoder 225.

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations.

The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205).

The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

Figure 3:
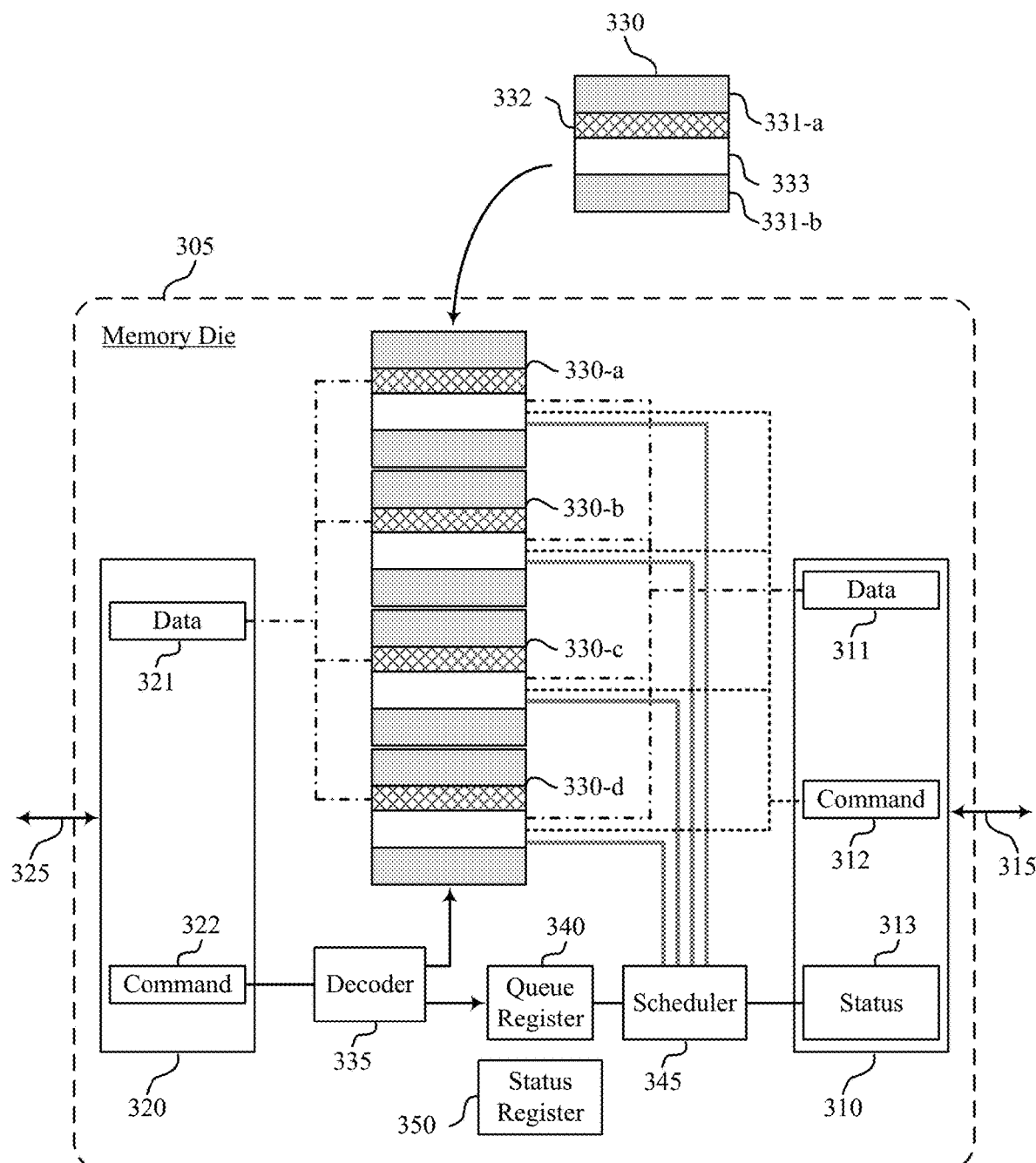
FIG. 3 illustrates an example diagram that supports a data migration dynamic random access memory as described herein.

FIG. 3 illustrates an example diagram 300 that supports a data migration dynamic random access memory as described herein. The diagram 300 illustrates how a memory device (e.g., DRAM) configured with at least two interfaces (e.g., DDR4 interface and data port interface as described herein) may support a data migration operation as part of a background operation while a host device may cause a section of the memory device to be accessed as part of an access operation.

The diagram 300 may include one or more components described herein with reference to FIGS. 1 and 2. For example, the diagram 300 may include a memory die 305, which may be an example of memory dice 160 or a memory die 200 as described with reference to FIG. 1 and FIG. 2; an interface 310 (e.g., data port interface as described herein) that may be configured to communicate with a controller through a channel 315; a second interface 320 (e.g., DDR4 interface as described herein) that may be configured to communicate with a host device (e.g., a memory controller of a host device) through a second channel 325; and one or more bank clusters 330. The memory die 305 may include a decoder 335; a first register 340; a scheduler 345; and a second register 350. The diagram 300 depicts four (4) bank clusters (e.g., bank cluster 330-a, 330-b, 330-c, and 330-d) within the memory die 305 as an example to illustrate aspects of the data migration dynamic random access memory, although the disclosure herein is not limited to such examples.

The interface 310 of the memory die 305 may be configured to communicate with a controller associated with a larger memory system (e.g., device memory controller 155 described with reference to FIG. 1) as part of a data migration operation. In some cases, the interface 310 may include a data channel 311 configured to transmit and receive data between a buffer 333 and the controller, a command channel 312 configured to receive an access command from the controller, a status channel 313 (which may also be referred to as a response channel) configured to transmit a response to the controller, or a data bus, or any combination thereof. In some cases, the data channel may be bidirectional to facilitate transfer of data in and out of the memory die 305 (e.g., buffer 333 of the memory die 305 using data channel 311). The command channel 312 (e.g., receiving a command from the controller) and the status channel 313 (e.g., transmitting a response or a status update to the controller) may be unidirectional.

The second interface 320 of the memory die 305 may be configured to communicate commands (e.g., using command channel 322) or data (e.g., using data channel 321) with a host device (e.g., a memory controller of a host device) as part of a data migration operation or an access operation (e.g., foreground operation). In some cases, the second interface 320 may be configured to conform to an industry standard or specification (e.g., DDR specification).

The memory die 305 may include a set of bank clusters 330—e.g., four (4) bank clusters (e.g., bank cluster 330-a, 330-b, 330-c, and 330-d) depicted in FIG. 3. Each bank cluster 330 may include two or more banks 331 (e.g., bank 331-a, bank 331-b). The bank cluster 330 may include a set of sense components 332 (e.g., sense component 245 described with reference to FIG. 2) that may be coupled with memory cells of the two or more banks of the bank cluster 330.

In some cases, one or more buffers 333 may be coupled with each bank cluster 330. One or more buffers 333 may be coupled with two or more banks (e.g., bank 331-a, bank 331-b) of a bank cluster (e.g., bank cluster 330) such that data or a subset of data (e.g., a page of data) may be transferred between one of the buffers 333 and one of the banks 331 during a data migration operation. The buffer 333 may be configured to store data (e.g., a page of data) as part of the data migration operation—e.g., storing data received from a controller (e.g., data migration controller) before storing the data in a bank of a bank cluster or storing data read from a bank of a bank cluster before transmitting the data to a controller (e.g., data migration controller). Memory die 305 may include groups of one or more buffers 333 that each may be configured to couple with a bank cluster. The groups of one or more buffers 333 may be distributed within the memory die 305.

Thus, in some cases, the memory die 305 may include a bank cluster including a first bank and a second bank, where the bank cluster may be coupled with a buffer that may be configured to store data as part of a data migration operation. Additionally, the memory die 305 may include a second bank cluster including a third bank and a fourth bank and a second buffer coupled with the second bank cluster and configured to store data associated with at least one of the third bank or the fourth bank during a second data migration operation.

In some cases, a first bank of a bank cluster (e.g., bank 331-a of bank cluster 330) may be configured to be accessed by a memory controller (e.g., external memory controller 105) during an access period as part of an access operation using the second interface 320 (e.g., using data channel 321 of the second interface 320). In addition, a second bank (e.g., bank 331-b of bank cluster 330, an alternate bank of bank cluster 330) may be configured to transfer data with a buffer (e.g., buffer 333 coupled with bank cluster 330) during the access period as part of a data migration operation concurrent with the first bank (e.g., bank 331-a of bank cluster 330) being accessed by the memory controller.

The buffer 333 may be coupled with the interface 310 (e.g., data port interface as described herein) and configured to communicate data with the controller (e.g., data migration controller) through the interface 310 during a data migration operation. In some cases, the buffer (e.g., buffer 333) may be configured to transmit an indication that the buffer stores data to be written to a bank of a bank cluster or read from the buffer 333. In some cases, such indication may correspond to a valid state of the buffer 333—e.g., data available to be written into a bank of a bank cluster or to be read from the buffer 333 to be written into a different bank (e.g., a bank of 3D XPoint™ memory device). In other cases, the buffer (e.g., buffer 333) may be configured to transmit an indication that the buffer is available for performing another data migration operation after completing the data migration operation. In some cases, such indication may correspond to an invalid state of the buffer 333—e.g., no valid data in the buffer 333 or old data in the buffer 333 that may be overwritten.

In some cases, the buffer 333 may be coupled with the interface 310 (e.g., data port interface as described herein) and configured to receive an access command from the controller (e.g., data migration controller) through the interface 310 (e.g., using the command channel 312 of the interface 310) as part of the data migration operation. Further, the buffer may be configured to transmit, to the controller through the interface 310 (e.g., using the status channel 313), an indication of an access command received from the memory controller or an update of a status that is associated with the data migration operation.

The memory die 305 may receive a command from a memory controller (e.g., a memory controller of a host device, external memory controller 105) using the command channel 322 of the second interface 320. The decoder 335 of the memory die 305 may be configured to decode the command. In some cases, the command may include an access command directed to the bank cluster (e.g., bank cluster 330-a, 330-b, 330-c, and 330-d) during a data migration operation (e.g., a background operation). The access command associated with the data migration operation (e.g., evict operation, commit operation) may be transmitted to the first register 340 that may be coupled with the scheduler 345. The scheduler 345 may transmit an indication that the access command has been received from the memory controller (e.g., the memory controller of the host device, external memory controller 105) using the status channel 313 of the interface 310 to a controller (e.g., data migration controller). In other cases, the command from the memory controller may include commands associated with some DRAM operations (e.g., read/write commands that address banks of the bank clusters) that may be performed as part of servicing the requests of the host device. The decoder 335 may also route such commands (e.g., DRAM commands) to the bank clusters.

The first register 340 (which may also be referred to as a queue register) may be configured to track one or more data migration operations (e.g., when one or more commands from a memory controller of a host device includes access commands associated with one or more data migration operations). The first register 340 (e.g., queue register) may be coupled with a scheduler (e.g., scheduler 345) that is coupled with the interface (e.g., interface 310) coupled with a controller (e.g., data migration controller).

The scheduler 345 (which may also be referred to as a response scheduler or a status update scheduler) may be configured to receive a response from the buffer and/or transmit a response from a buffer 333 to a controller (e.g., data migration controller) using the status channel 313 of the interface 310—e.g., when the buffer 333 stores data from a bank of a bank cluster based on receiving a command associated with an evict operation from the controller or when the buffer 333 stores data in a bank of a bank cluster based on receiving a command associated with a commit operation from the controller. The scheduler 345 may transmit an indication that the access command has been received from the memory controller (e.g., the memory controller of the host device, external memory controller 105) using the status channel 313 of the interface 310 to a controller (e.g., data migration controller).

The second register 350 (which may also be referred to as a status register) may be configured to indicate a status associated with the data migration operation. In some cases, the status may indicate a completion of a particular data migration operation. In other cases, the status may be associated with a valid state of the buffer 333 or an invalid state of the buffer 333.

In some cases, an apparatus may include an interface (e.g., data port interface as described herein) configured to communicate with a controller (e.g., data migration controller) as part of a data migration operation, a buffer (e.g., data transfer buffer) coupled with the interface and configured to store data as part of the data migration operation, and a bank cluster including a first bank and a second bank and coupled with the buffer. The first bank may be configured to be accessed by a memory controller (e.g., a memory controller of a host device) during an access period as part of an access operation and the second bank may be configured to transfer data with the buffer during the access period as part of the data migration operation concurrent with the first bank being accessed by the memory controller.

Figure 4:
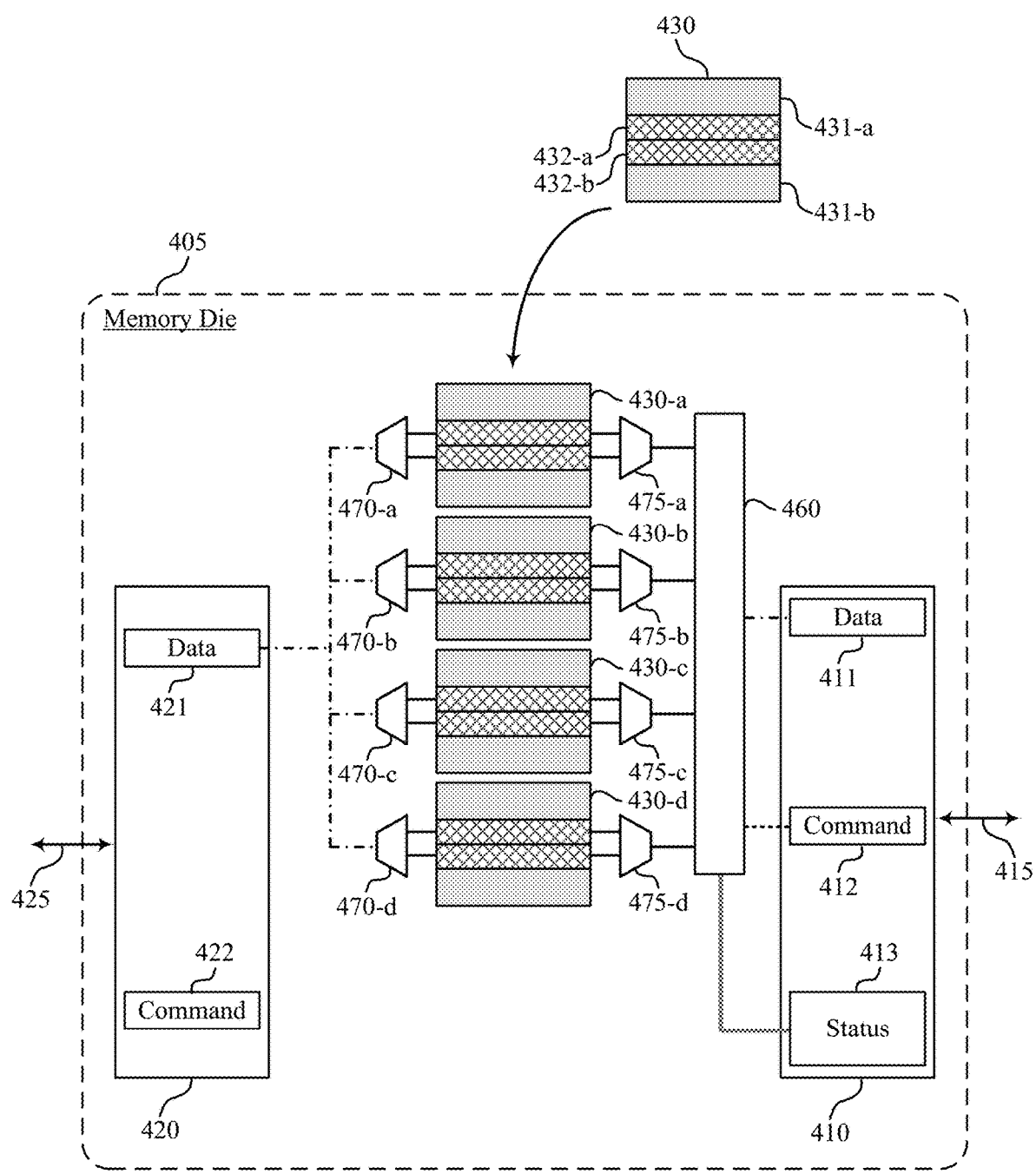
FIG. 4 illustrates another example diagram that supports a data migration dynamic random access memory as described herein.

FIG. 4 illustrates an example diagram 400 that supports a data migration dynamic random access memory as described herein. The diagram 400 illustrates another example of an arrangement of components that can perform the functions described herein. The diagram 400 illustrates an example where a common buffer is coupled with a plurality of bank clusters, instead of each bank cluster being associated with a dedicated buffer as described with reference to some portions of FIG. 3.

The diagram 400 may include various components described with reference to FIG. 3. The description of such components described with reference to FIG. 3 is hereby incorporated into the description related to the diagram 400 and FIG. 4. For example, the diagram 400 may include a memory die 405, which may be an example of a memory die 305 as described with reference to FIG. 3; an interface 410 (e.g., data port interface as described herein) that may be configured to communicate with a controller through a channel 415; a second interface 420 (e.g., DDR4 interface as described herein) that may be configured to communicate with a host device (e.g., a memory controller of a host device) through a second channel 425; and one or more bank clusters 430. The memory die 405 may also include a buffer 460, first multiplexers 470, and second multiplexers 475. The diagram 400 depicts four (4) bank clusters within the memory die 405 as an example to illustrate aspects of the data migration dynamic random access memory, although the disclosure herein is not limited to such examples. In some examples, the memory die 405 may include two bank clusters, three bank clusters, four bank clusters, five bank clusters, six bank clusters, seven bank clusters, eight bank clusters, or any quantity of bank clusters. The memory die 405 may also other components such as a decoder 335, a first register 340; a scheduler 345; and a second register 350 described with reference to FIG. 3, but not depicted in FIG. 4.

The memory die 405 may include a set of bank clusters (e.g., bank cluster 430-a, 430-b, 430-c, and 430-d). Each bank cluster of the set (e.g., bank cluster 430) may include a set of banks (e.g., bank 431-a, bank 431-b) and a set of sense components (e.g., sense component 432-a, sense component 432-b).

The buffer 460 may be coupled with the set of bank clusters and the interface 410 that may be configured to communicate with a controller (e.g., data migration controller) as part of one or more data migration operations. The buffer 460 may be configured to store data associated with the set of banks as part of the one or more data migration operations that each include transferring data between the buffer 460 and a first bank of a first bank cluster (e.g., the bank 431-a of the bank cluster 430) while a second bank of the first bank cluster (e.g., the bank 431-b of the bank cluster 430) may be accessed by a memory controller (e.g., a memory controller of a host device). The buffer 460 may be regarded as a common buffer associated with the set of bank clusters in the memory die 405 and may be configured to communicate data with a controller (e.g., data migration controller) using data channel 411 of the interface 410.

In some cases, the buffer 460 may be configured to store a first quantity of data (e.g., a subset of a page of data) during at least a portion of one of the one or more data migration operations, where the first quantity of data may be less than a total quantity of data (e.g., a page of data) migrated during the one or more data migration operations. Further, the buffer 460 may also be configured to receive command associated with the one of more data migration operation using command channel 412 of the interface 410 or to transmit a response or a status update to the controller using status channel 413 of the interface 410 (e.g., using the scheduler 345 as described with reference to FIG. 3).

The first multiplexers 470 may be configured to couple the set of bank clusters with the second interface 420 that may be configured to communicate commands (e.g., using command channel 422 of the second interface 420) or data (e.g., using data channel 421 of the second interface 420) with the memory controller (e.g., the memory controller of the host device). In some cases, the commands or the data may include an indication to identify at least one multiplexors of the first multiplexors 470. The first multiplexer 470-a may identify a particular sense component of the set that may be associated with a command accessing a particular bank of the set of bank clusters (e.g., bank cluster 430-a) during an access operation as part of a foreground operation.

The second multiplexers 475 may be configured to couple the set of bank clusters with the buffer 460. The second multiplexer 475-b may identify a particular sense component of the set that may be associated with a command associated with the one or more data migration operations directed to a particular bank of the set of bank clusters (e.g., bank cluster 430-b). In some cases, the memory die 405 may not include the first multiplexers 470 or the second multiplexer 475.

In some cases, an apparatus may include an interface (e.g., the interface 410, data port interface) configured to communicate with a controller (e.g., data migration controller) as part of one or more data migration operations. The apparatus may also include a set of bank clusters (e.g., bank cluster 430-a, 430-b, 430-c, and 430-d) that each include a set of banks and a set of sense components. In some cases, the apparatus may include the buffer 460 coupled with the set of bank clusters and the interface, where the buffer 460 may be configured to store data associated with the set of banks as part of the one or more data migration operations. Each of data migration operations may include transferring data between the buffer 460 and a first bank of a first bank cluster (e.g., the bank 431-a of the bank cluster 430) while a second bank of the first bank cluster (e.g., the bank 431-b of the bank cluster 430) may be accessed by a memory controller (e.g., a memory controller of a host device).

Further details of a data migration dynamic random access memory as described herein will be described with reference to FIG. 5.

Figure 5:
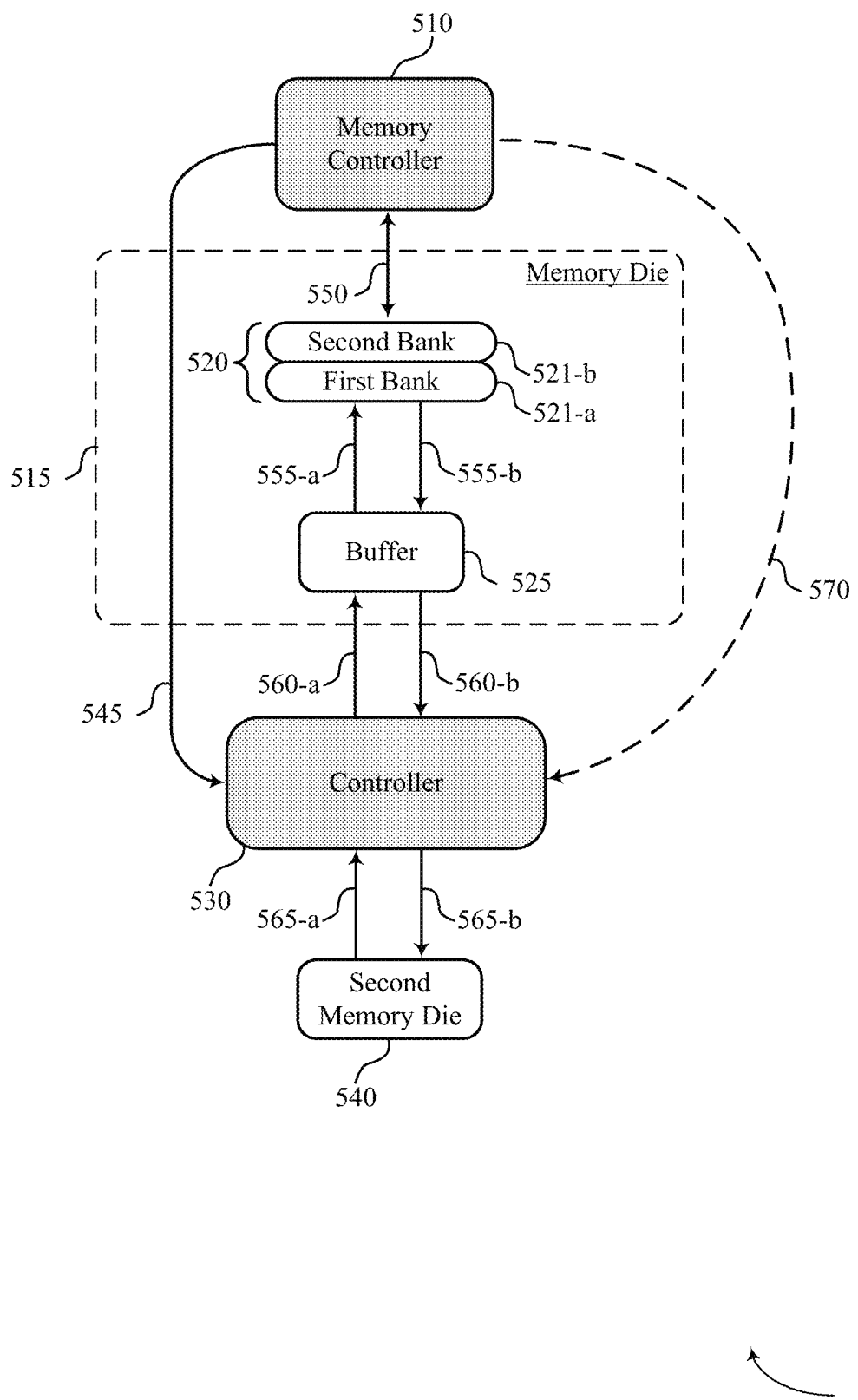
FIG. 5 illustrates an example diagram that supports a data migration dynamic random access memory as described herein.

FIG. 5 illustrates an example diagram 500 that supports a data migration dynamic random access memory as described herein. In some cases, a controller (e.g., data migration controller as described herein, device memory controller 155 described with reference to FIG. 1, or the like) may perform or manage various aspects of the data migration operation depicted in the diagram 500. The diagram 500 may illustrate example operational characteristics of a memory system that supports a data migration dynamic random access memory as described herein.

The diagram 500 illustrates a memory controller 510 (e.g., a memory controller of a host device), which may be an example of an external memory controller 105 described with reference to FIG. 1; a memory die 515, which may be an example of memory dice 160, memory die 200, memory die 305, or memory die 405 described with reference to FIGS. 1 through 4; a bank cluster 520, which may be an example of bank cluster 330 or bank cluster 430 described with reference to FIG. 3 and FIG. 4; a first bank 521-a and a second bank 521-b, which may be examples of banks 331 or banks 431 described with reference to FIG. 3 and FIG. 4; a buffer 525, which may be an example of buffer 333 or buffer 460 described with reference to FIG. 3 and FIG. 4; a controller 530, which may be an example of device memory controller 155 described with reference to FIG. 1; and a second memory die 540, which may be an example of a memory dice 160 or a memory device 110 described with reference to FIG. 1. In some cases, the memory die 515 may include memory cells that implement volatile memory technology and the second memory die 540 may include memory cells that implement non-volatile memory technology.

Operation 545 may include the controller 530 receiving a command to transfer data between the first bank 521-*a* of the bank cluster 520 and a different bank (e.g., a bank in second memory die 540) as part of a data migration operation. In some cases, the memory controller 510 (e.g., a memory controller of a host device) may initiate a data migration operation when the memory die 515 does not include data that the host device requests (e.g., during a read operation) or the memory die 515 includes an inadequate amount of space to store data that the host device wants to store in the memory die 515.

In some cases, the memory die 515 (e.g., a local controller of the memory die 515) may receive the command using the command channel 322 of the second interface 320. In some cases, the decoder 335 of the memory die 515 may decode the command and identify an access command directed to the bank cluster 520 during the data migration operation. Subsequently, the access command associated with the data migration operation (e.g., evict operation, commit operation) may be transmitted to the first register 340 (e.g., queue register) that may be coupled with the scheduler 345. The scheduler 345 may transmit an indication that the access command was received from the memory controller 510 to the controller 530 using the status channel 313 of the interface 310. In some cases, the memory die 515 (e.g., local controller of memory die 515) may transmit at least a portion of the command to the controller 530 using the first interface (e.g., interface 310) of the memory die 515.

Operation 560-*a* may include the controller 530 transmitting a command, in response to receiving the indication of the access command from the memory controller 510, to the memory die 515 (e.g., local controller of memory die 515) using the first interface (e.g., interface 310). In some cases, the controller 530 may transmit the command using the command channel 312 of the interface 310 that may be coupled with the buffer 525 of the memory die 515.

In some cases, the command may be associated with an operation causing data to be stored in the bank cluster 520, where the data may have been read from the second memory die 540 as part of operation 565-*a*. In some cases, such command may be referred to as a commit command or associated with a commit operation. In such cases, operation 560-*a* may also include the controller 530 transmitting the data to the buffer 525 such that the buffer 525 may store the data to be written to a bank (e.g., first bank 521-*a*) of the bank cluster 520. The controller 530 may transmit the data to the buffer 525 using the data channel 311 of interface 310.

In such cases, operation 560-*b* may include the buffer 525 transmitting an indication back to the controller 530, where the indication may indicate that the buffer 525 includes the data received from the controller 530, or is configured to transfer the data to the first bank 521-*a* of the bank cluster 520, or both. The buffer 525 may use the status channel 313 of the interface 310 to transmit such indication. In some cases, the scheduler 345 may transmit such indication using the status channel 313 of the interface 310. The indication may be associated with a valid state of the buffer 525 indicating that the data has been stored at the buffer 525 and the buffer 525 is ready to transfer the data to a bank (e.g., first bank 521-*a*) of the bank cluster 520.

Subsequently, the controller 530 may determine that the memory controller 510 (e.g., a memory controller of a host device) addresses the second bank 521-*b* of the bank cluster 520 during an access period (e.g., as part of a foreground operation) as part of operation 550 using the second interface 320 of the memory die 515. When the memory controller 510 addresses the second bank 521-*b* of the bank cluster 520 during the access period, the controller 530 may concurrently store the data from the buffer 525 in the first bank 521-*a* of the bank cluster 520 (e.g., as part of a background operation).

Operation 555-*a* may include the controller 530, based on determining that the memory controller 510 addresses the second bank 521-*b*, transferring the data between the first bank 521-*a* and the buffer 525 (e.g., writing the data in the first bank) as part of the data migration operation during the access period and based on the command received as part of operation 545. In other words, the buffer 525 may opportunistically store the data in the first bank 521-*a* during operation 555-*a* such that the data migration operation may be performed while the memory controller 510 performs an access operation without incurring significant impact to the system performance due to the data migration operation—e.g., the data migration operation may be hidden from the host device.

In some cases, the memory die 515 (e.g., local controller of the memory die 515) may transmit a status of the data migration command to the memory controller 510 based on performing the operation (e.g., writing the data in the bank cluster 520, where the data has been read from the second memory die 540) and receiving a polling command from the memory controller 510. In some cases, the memory controller 510 may be configured to transmit a polling command that requests a status update associated a command (e.g., a data migration command associated with a commit operation) that the memory controller 510 has transmitted.

In other cases, the command may be associated with an operation causing data to be read from the bank cluster 520 such that the data may be transferred to the second memory die 540. In some cases, such command may be referred to as an evict command or associated with an evict operation.

In such cases, operation 560-*b* may include the buffer 525 transmitting an indication back to the controller 530, where the indication indicates that the buffer 525 is available to store data to be read from a bank (e.g., first bank 521-*a*) of the bank cluster. The buffer 525 may use the status channel 313 of the interface 310 to transmit such indication. In some cases, the scheduler 345 may transmit such indication using the status channel 313 of the interface 310. The indication may be associated with a valid state of the buffer 525 indicating that the buffer 525 is available to store data to be read from a bank (e.g., first bank 521-*a*) of the bank cluster 520.

Subsequently, the controller 530 may determine that the memory controller 510 (e.g., a memory controller of a host device) addresses the second bank 521-*b* of the bank cluster 520 during an access period (e.g., as part of a foreground operation) as part of operation 550 using the second interface 320 of the memory die 515. When the memory controller 510 addresses the second bank 521-*b* of the bank cluster 520 during the access period, the controller 530 may concurrently access the first bank 521-*a* of the bank cluster 520 to read some of data from the first bank 521-*a* to the buffer 525 (e.g., as part of a background operation).

Operation 555-*b* may include the controller 530, based on determining that the memory controller 510 addresses the second bank 521-*b*, transferring the data between the first bank 521-*a* and the buffer 525 (e.g., reading the data from the first bank) as part of the data migration operation during the access period and based on the command received as part of operation 545. In other words, the buffer 525 may opportunistically read data from the first bank 521-*a* and store the data in the buffer 525 during operation 555-*b* such that the data migration operation may be performed while the memory controller 510 performs an access operation without incurring any impact to the system performance due to the data migration operation—e.g., the data migration operation may be hidden from the host device.

Operation 560-*b* may include the buffer 525 transmitting an indication that the buffer 525 includes the data read from the first bank, or is ready to transfer the data to the controller 530, or both. The controller 530 may transfer the data out of the buffer 525 as part of operation 560-*b*. Further, the controller 530 may transfer the data to the second memory die 540 as part of operation 565-*b* to save the data therein.

In some cases, the memory die 515 (e.g., local controller of the memory die 515) may transmit a status of the data migration command to the memory controller 510 based on performing the operation (e.g., reading the data from the bank cluster 520 and transferring the data to the controller 530) and receiving a polling command from the memory controller 510. In some cases, the memory controller 510 may be configured to transmit a polling command that requests a status update associated a command (e.g., a data migration command associated with an evict operation) that the memory controller 510 has transmitted.

In some cases, the memory die 515 (e.g., local controller of the memory die 515), the controller 530, or the controller 530 in conjunction with the memory die 515 may transmit an indication that the transfer of the data between the first bank 521-*a* of the bank cluster 520 and the buffer 525 is complete. In some cases, such indication may be transmitted using a channel of an interface, where the channel may be configured to transmit an indication that the data have been stored in the buffer—e.g., the status channel 313 of the interface 310. In some cases, the indication may indicate that the data is transferred from the buffer 525 and is stored in the first bank 521-*a* of the bank cluster 520 as part of the data migration operation (e.g., a commit operation). In other cases, the indication may indicate that the data is transferred from the first bank 521-*a* of the bank cluster 520 to the buffer 525 as part of the data migration operation (e.g., an evict operation).

In some cases, the memory die 515 (e.g., local controller of the memory die 515), the controller 530, or the controller 530 in conjunction with the memory die 515 may identify, based on receiving the command from the memory controller 510, the buffer coupled with the bank cluster as part of the data migration operation, where transferring the data between the first bank of the bank cluster and the buffer is based on identifying the buffer. In some cases, the memory die 515 (e.g., local controller of the memory die 515), the controller 530, or the controller 530 in conjunction with the memory die 515 may identify an address of the first bank of the bank cluster based on receiving the command from the memory controller 510 to transfer the data, where transferring the data between the first bank of the bank cluster and the buffer is based on identifying the address of the first bank of the bank cluster, and access the first bank of the bank cluster based on identifying the address of the first bank.

In some cases, the memory die 515 (e.g., local controller of the memory die 515), the controller 530, or the controller 530 in conjunction with the memory die 515 may activate a subset of the first bank of the bank cluster based on determining that the memory controller 510 (e.g., a host device) addresses the second bank of the bank cluster, where a subset of the second bank is activated when the second bank of the bank cluster is addressed, and where transferring the data between the first bank of the bank cluster and the buffer is based on activating the subset of the first bank. In some cases, the memory die 515 (e.g., a local controller of the memory die 515), the controller 530, or the controller 530 in conjunction with the memory die 515 may issue a first column command for a subset of the first bank of the bank cluster based on determining that the host device addresses the second bank of the bank cluster, where a second column command is issued for a subset of the second bank when the second bank of the bank cluster is addressed, and where transferring the data between the first bank of the bank cluster and the buffer is based on issuing the first column command In some cases, the memory controller 510 (e.g., a host device) may transmit a command directly to the controller 530 as part of operation 570 without using the interface 310 or a second interface 320 of the memory die 515. The command may be associated with transferring data between the first bank 521-*a* of the bank cluster 520 and a different bank (e.g., a bank in the second memory die 540) as part of a data migration operation. In some cases, operation 570 may be performed using a channel configured to provide optional channels for the memory controller 510 (e.g., a host device). In some examples, the channel may be referred to as a side channel or a sideband channel. In some cases, the channel may include a general purpose input/output (GPIO) channel, or a standard channel, or a custom interface, or a combination thereof. In some examples, the channel may include aspects of the other channel 192 as described with reference to FIG. 1.

In some cases, the memory controller 510 (e.g., a memory controller of a host device) may communicate with the memory die 515 using a second interface (e.g., DDR4 interface, DDR5 interface, second interface 320) to perform various access operations (e.g., read operation, write operation) as part of a foreground operation. Additionally, the memory controller 510 may determine to transmit a command associated with a data migration operation. In some cases, the memory controller 510 may transmit such a command when a memory die 515 (e.g., memory die 160-*a* including DRAM cells) lacks data that the host device requests (e.g., during a read operation) or includes an inadequate space to store data that the host device wants to save (e.g., during a write operation). The memory controller 510 may transmit the command to the controller 530 (e.g., data migration controller) either using the memory die 515 or using the channel configured to provide optional channels for the memory controller 510. When the memory controller 510 transmits the command using the memory die 515, the memory controller 510 may use the second interface (e.g., DDR4 interface, DDR5 interface, the second interface 320) and the first interface (e.g., data port interface, the interface 310).

The controller 530 (e.g., data migration controller) may execute the command to transfer data between the buffer 525 of the memory die 515 and the bank cluster 520 of the memory die 515 as part of a data migration operation such that the memory die 515 may include the data that the memory controller 510 requests or an adequate space to store the data that the memory controller 510 wants to save. In other words, the memory controller 510 may initiate one or more data migration operation that may be executed by the controller 530 as part of a background operation taking advantage of having two interfaces, namely the first interface (e.g., data migration port, the interface 310) and the second interface (e.g., DDR4 interface, DDR5 interface, the second interface 320).

Figure 6:
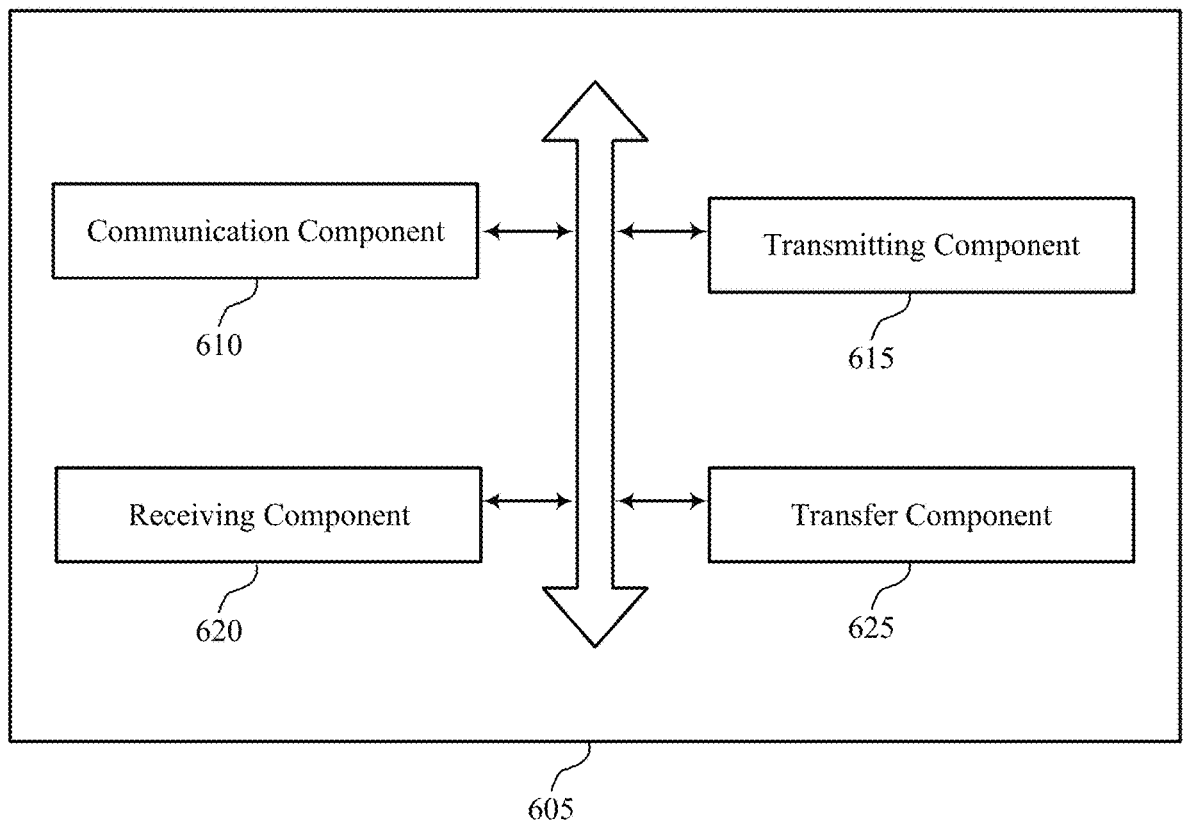
FIG. 6 illustrates an example block diagram of a device or devices that support a data migration dynamic random access memory as described herein.

FIG. 6 shows an example block diagram 600 of a device 605 that supports a data migration dynamic random access memory as described herein. The device 605 may be an example of aspects of a controller (e.g., device memory controller 155, local memory controller 165, local memory controller 260, as described with reference to FIGS. 1 and 2). The device 605 may include a communication component 610, a transmitting component 615, a receiving component 620, and a transfer component 625. Each of these components may communicate, directly or indirectly, with one another (e.g., via one or more buses).

The communication component 610 may receive a data migration command from a host device using a second interface. In some cases, the communication component 610 may transmit a status of the data migration command to the host device based on performing an operation and receiving a polling command from the host device.

The transmitting component 615 may transmit at least a portion of the data migration command to a controller using an interface.

The receiving component 620 may receive a command from the controller based on transmitting the at least the portion of the data migration command.

The transfer component 625 may perform an operation indicated in the command received from the controller.

In some cases, the portion of the data migration command may include an evict command for the controller to access the second memory device. In some cases, the operation may include reading data from the second memory device. In some cases, the status of the data migration command may include an output of a status register of the second memory device, the status register configured to indicate a status associated with the evict command. In some cases, the portion of the data migration command may include a commit command for the controller to access the second memory device. In some cases, the operation may include storing data to the second memory device. In some cases, the status of the data migration command may include an output of a status register of the second memory device, the status register configured to indicate a status associated with the commit command.

Figure 7:
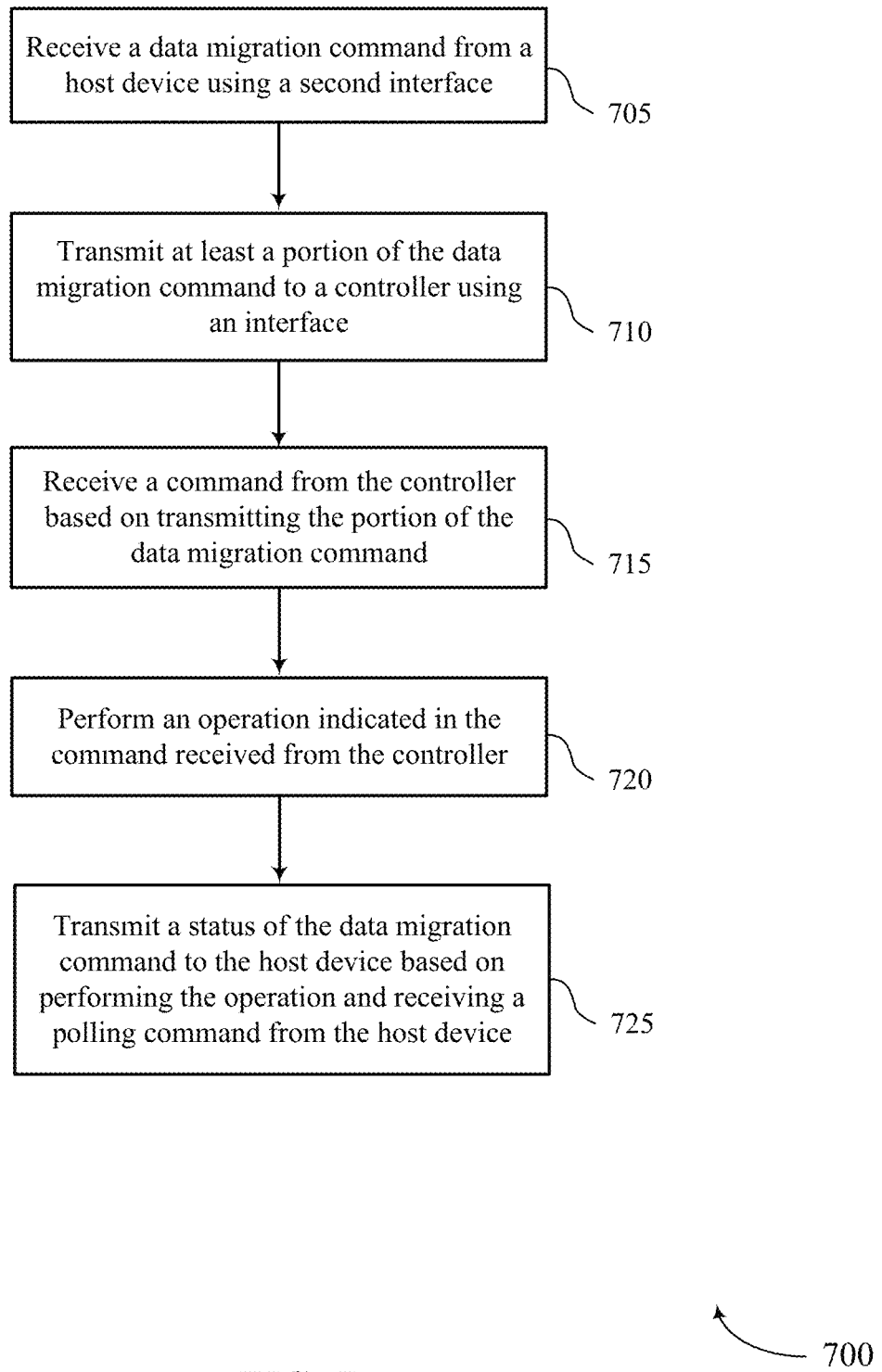
FIG. 7 shows flowchart illustrating a method or methods that support a data migration dynamic random access memory as described herein.

FIG. 7 shows a flowchart illustrating a method 700 that supports a data migration dynamic random access memory as described herein. The operations of method 700 may be implemented by a controller or its components as described with reference to FIGS. 3 through 6. For example, the operations of method 700 may be performed by a controller (e.g., device memory controller 155, local memory controller 165, local memory controller 260, as described with reference to FIGS. 1 and 2). In some examples, a controller may execute a set of instructions to control the functional elements of the memory array to perform the functions described herein. Additionally or alternatively, a controller may perform aspects of the functions described herein using special-purpose hardware.

At 705 the controller may receive a data migration command from a host device using a second interface. In some examples, aspects of the operations of 705 may be performed by a communication component 610 as described with reference to FIG. 6.

At 710 the controller may transmit at least a portion of the data migration command to a controller using an interface. In some examples, aspects of the operations of 710 may be performed by a transmitting component 615 as described with reference to FIG. 6.

At 715 the controller may receive a command from the controller based on transmitting the at least the portion of the data migration command. In some examples, aspects of the operations of 715 may be performed by a receiving component 620 as described with reference to FIG. 6.

At 720 the controller may perform an operation indicated in the command received from the controller. In some examples, aspects of the operations of 720 may be performed by a transfer component 625 as described with reference to FIG. 6.

At 725 the controller may transmit a status of the data migration command to the host device based on performing the operation and receiving a polling command from the host device. In some examples, aspects of the operations of 725 may be performed by the communication component 610 as described with reference to FIG. 6.

An apparatus for performing a method or methods, such as the method 700, is described. The apparatus may include means for receiving a data migration command from a host device using a second interface, means for transmitting at least a portion of the data migration command to a controller using an interface, means for receiving a command from the controller based on transmitting the at least the portion of the data migration command, means for performing an operation indicated in the command received from the controller, and means for transmitting a status of the data migration command to the host device based on performing the operation and receiving a polling command from the host device.

Another apparatus for performing a method or methods, such as the method 700, is described. The apparatus may include a memory array and a controller in electronic communication with the memory array, where the controller may be operable to receive a data migration command from a host device using a second interface, transmit at least a portion of the data migration command to a controller using an interface, receive a command from the controller based on transmitting the at least the portion of the data migration command, perform an operation indicated in the command received from the controller, and transmit a status of the data migration command to the host device based on performing the operation and receiving a polling command from the host device.

In some examples of the method 700 and apparatuses described herein, the portion of the data migration command includes an evict command for the controller to access the second memory device, the operation includes reading data from the second memory device, and the status of the data migration command includes an output of a status register of the second memory device, the status register configured to indicate a status associated with the evict command. In some examples of the method 700 and apparatuses described herein, the portion of the data migration command includes a commit command for the controller to access the second memory device, the operation includes storing data to the second memory device, and the status of the data migration command includes an output of a status register of the second memory device, the status register configured to indicate a status associated with the commit command.

It should be noted that the methods described herein describe possible implementations, and that the operations and the steps may be rearranged or otherwise modified and that other implementations are possible. Furthermore, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The term "layer" used herein refers to a stratum or sheet of a geometrical structure. each layer may have three dimensions (e.g., height, width, and depth) and may cover at least a portion of a surface. For example, a layer may be a three-dimensional structure where two dimensions are greater than a third, e.g., a thin-film. Layers may include different elements, components, and/or materials. In some cases, one layer may be composed of two or more sublayers. In some of the appended figures, two dimensions of a three-dimensional layer are depicted for purposes of illustration. Those skilled in the art will, however, recognize that the layers are three-dimensional in nature.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and include a three terminal device including a source, drain, and gate. The terminals may be connected to other electronic elements through conductive materials, e.g., metals. The source and drain may be conductive and may include a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
an interface configured to communicate with a controller as part of a data migration operation;
a buffer coupled with the interface and configured to store data as part of the data migration operation; and
a bank cluster comprising a first bank and a second bank and coupled with the buffer, the first bank configured to be accessed by a memory controller during an access period as part of an access operation, the second bank configured to transfer data with the buffer during the access period as part of the data migration operation concurrent with the first bank being accessed by the memory controller, wherein the buffer is configured to transmit, prior to the first bank being accessed, an indication that the buffer stores data to be written to a bank of the bank cluster or read from the buffer.

2. The apparatus of claim 1, further comprising:
a second interface coupled with the bank cluster and configured to communicate commands or data with the memory controller as part of the data migration operation.

3. The apparatus of claim 1, further comprising:
a second bank cluster comprising a third bank and a fourth bank; and
a second buffer coupled with the second bank cluster and configured to store data associated with at least one of the third bank or the fourth bank during a second data migration operation.

4. The apparatus of claim 1, wherein the buffer is further configured to communicate data with the controller through the interface during the data migration operation.

5. The apparatus of claim 1, wherein the buffer is configured to transmit an indication that the buffer is available for performing another data migration operation after completing the data migration operation.

6. The apparatus of claim 1, wherein the buffer is configured to receive an access command from the controller through the interface as part of the data migration operation.

7. The apparatus of claim 1, wherein the interface comprises a data channel configured to transmit and receive data between the buffer and the controller, a command channel configured to receive an access command from the controller, a response channel configured to transmit a response to the controller, or a data bus, or any combination thereof.

8. The apparatus of claim 1, further comprising:
a decoder configured to decode a command from the memory controller, the command comprising an access command directed to the bank cluster during the data migration operation.

9. The apparatus of claim 1, further comprising:
a register configured to track one or more data migration operations, the register coupled with a scheduler that is coupled with the interface.

10. The apparatus of claim 1, further comprising:
a scheduler configured to transmit a response from the buffer to the controller, or an indication of an access command received from the memory controller to the controller, or both.

11. The apparatus of claim 1, further comprising:
a register configured to indicate a status associated with the data migration operation.

12. The apparatus of claim 1, wherein the bank cluster comprises a plurality of banks and a single bank of the plurality of banks is configured to be accessed by the memory controller during the access period as part of the access operation.

13. The apparatus of claim 1, further comprising:
a channel configured to relay a command associated with the data migration operation from the memory controller to the controller of the apparatus.

14. An apparatus, comprising:
an interface configured to communicate with a controller as part of a data migration operation;
a buffer coupled with the interface and configured to store data as part of the data migration operation, wherein the buffer is configured to transmit, to the controller through the interface, an indication of an access command received from a memory controller or an update of a status that is associated with the data migration operation; and
a bank cluster comprising a first bank and a second bank and coupled with the buffer, the first bank configured to be accessed by the memory controller during an access period as part of an access operation, the second bank configured to transfer data with the buffer during the access period as part of the data migration operation concurrent with the first bank being accessed by the memory controller.

15. An apparatus, comprising:
an interface configured to communicate with a controller as part of one or more data migration operations;
a plurality of bank clusters each comprising a plurality of banks and a plurality of sense components;
a buffer coupled with the plurality of bank clusters and the interface and configured to store data associated with the plurality of banks as part of the one or more data migration operations that each comprise transferring data between the buffer and a first bank of a first bank cluster while a second bank of the first bank cluster is accessed by a memory controller;
a first multiplexer that couples the plurality of bank clusters with a second interface that is configured to communicate commands or data with the memory controller; and
a second multiplexer that couples the plurality of bank clusters with the buffer.

16. The apparatus of claim 15, wherein the buffer is configured to store a first quantity of data during at least a portion of one of the one or more data migration operations, the first quantity of data being less than a total quantity of data migrated during the one or more data migration operations.

17. An apparatus, comprising:
a controller;
a first memory device comprising memory cells of a first type and coupled with the controller;
a second memory device comprising: memory cells of a second type different than the first type;
a bank cluster;
one or more buffers coupled with the bank cluster and configured to store data associated with the bank cluster;
an interface coupled with the one or more buffers and configured to communicate with the controller;
a second interface coupled with the bank cluster and configured to communicate with a host device; and
a local controller coupled with the bank cluster, the one or more buffers, the interface, and the second interface, the local controller operable to:
  receive a data migration command from the host device using the second interface;
  transmit at least a portion of the data migration command to the controller using the interface;
  receive a command from the controller based at least in part on transmitting the at least the portion of the data migration command;
  perform an operation indicated in the command received from the controller; and transmit a status of the data migration command to the host device based at least in part on performing the operation and receiving a polling command from the host device.

18. The apparatus of claim 17, wherein:
the portion of the data migration command comprises an evict command for the controller to access the second memory device;
the operation comprises reading data from the second memory device; and
the status of the data migration command comprises an output of a status register of the second memory device, the status register configured to indicate a status associated with the evict command.

19. The apparatus of claim 17, wherein:
the portion of the data migration command comprises a commit command for the controller to access the second memory device;
the operation comprises storing data to the second memory device; and
the status of the data migration command comprises an output of a status register of the second memory device, the status register configured to indicate a status associated with the commit command.

* * * * *